United States Patent
Neuman

[11] 3,993,903
[45] Nov. 23, 1976

[54] LOW-COST BUT ACCURATE RADIOACTIVE LOGGING FOR DETERMINING GAS SATURATION IN A RESERVOIR

[75] Inventor: Charles H. Neuman, Placentia, Calif.

[73] Assignee: Chevron Research Company, San Francisco, Calif.

[22] Filed: Mar. 31, 1975

[21] Appl. No.: 563,923

[52] U.S. Cl. ............................. 250/258; 250/256; 250/270
[51] Int. Cl.$^2$ ......................................... G01V 5/00
[58] Field of Search .......... 250/258, 259, 262, 270, 250/256

[56] References Cited
UNITED STATES PATENTS

| | | | |
|---|---|---|---|
| 2,991,364 | 7/1961 | Goodman | 250/262 |
| 3,562,523 | 2/1971 | Richardson | 250/259 |
| 3,817,328 | 6/1974 | Neuman | 73/152 |

*Primary Examiner*—Harold A. Dixon
*Attorney, Agent, or Firm*—R. L. Freeland, Jr.; H. D. Messner

[57] ABSTRACT

A method is disclosed for determining gas saturation in a petroleum reservoir using logging signals indirectly related to the abundances of oxygen and carbon nuclei in the reservoir rock. The first step of the invention is to record first and second logs sensitive to the abundance of oxygen and carbon nuclei, respectively, after the region surrounding the well bore is caused to have fluid saturations representative of the bulk of the reservoir. A purposeful change is then made in the fluid saturations in the region surrounding the well bore by injecting a liquid capable of displacing substantially all of the original fluids. The logs are recorded a second time. The displacing fluid is then itself displaced by brine, and a third suite of logs is recorded. The total fluid and oil saturations are then determined from the differences between respective corresponding logs and from known fractional volume oxygen and carbon contents of the reservoir brine and oil and the first injected liquid. Gas saturation is then calculated from differences between total fluid and oil saturation values. It is not necessary that the log responses be independent of the material in the borehole, the casing, the casing cement, or the reservoir rock. It is only necessary that changes in formation fluids content cause proportional changes in log responses.

7 Claims, 4 Drawing Figures

LOW-COST BUT ACCURATE RADIOACTIVE LOGGING FOR DETERMINING GAS SATURATION IN A RESERVOIR

RELATED APPLICATIONS

The following applications filed concurrently herewith and assigned to the assignee of the present application are incorporated herein by reference: (1) Ser. No. 563,921, for "Radioactive Logging for Determining Oil Saturation in a Reservoir", Charles H. Neuman; and (2) Ser. No. 563,922, "563,922, "Low Cost but Accurate Radioactive Logging for Determining Water Saturation in a Reservoir," Charles H. Neuman.

FIELD OF THE INVENTION

This invention relates to radioactive logging methods. More particularly, it relates to the use of signals indirectly related to oxygen and carbon nucleus concentrations to determine the fractional content of gas in a porous petroleum reservoir rock containing oil, water, and gas.

BACKGROUND OF THE INVENTION

Economic feasibility of methods for secondary and tertiary recovery of petroleum often depends on accurate measurement of the quantity and location of reservoir gas in a formation after previous recovery processes have been completed. Such measurements are desirably carried out in "old" wells, i.e., in wells used to produce the formation. Reasons: (i) accuracy is increased; and (ii) costs are decreased; the process of drilling a new well displaces some fraction of the formation fluids originally in the formation away from the hole, and it is desirable to evaluate the potential recovery from a reservoir without incurring the expenses of drilling a new well.

In my U.S. Pat. No. 3,817,328 for "Neutrons Absorption and Oxygen Log for Measuring the oil content of Formations," June 18, 1974, assigned to the assignee of this application, I describe a method for accurately determining the oil content of a reservoir containing both mobile oil and a significant gas saturation including recording the response of both thermal-neutron-decay-time and neutron-activated-oxygen logs. A purposeful change was then made in the fluids in a given region of the formation surrounding the well bore by injecting fluid under sufficient pressure to displace them. The combination of the thermal-neutron-decay-time log and the oxygen log was then run again, and differences between the two sets of logs noted.

My method may be somewhat limited, however, by the requirement that the oxygen activation log be calibrated at least to the extend that changes between the separate logs must be proportional to changes in the oxygen content of the reservoir fluids with a predetermined single constant of proportionality. Thus, my method could not be utilized for accurate gas saturation indications in some applications, say where the responses from logging tools currently available are influenced by the pipe, cement and liquids in the well bore; experience indicates that calibration valid at all depths in the well is difficult (if not impossible) to achieve in such situations.

I am also aware of the contributions of others in the oil-content, water- and gas-saturation measuring fields. Such contributions (and their limitations) are set forth in detail in my copending applications, Ser. Nos. 563,921 and 563,922, filed concurrently herewith, op.cit.; suffice it to say, with regard to gas-saturation measurements, none of the methods, as far as I am aware, have been quantitative enough to generate accurate direct determination of gas content of a reservoir or to provide indirect data ("inferential and results"), say from total hydrocarbon and oil saturation measurements from which such gas saturations can be accurately calculated.

OBJECT OF THE INVENTION

The object of the present invention is the provision of a novel method for accurately determining gas saturation in a formation penetrated by a well bore using logs that produce signals that not only vary linearly with fluid saturations but in a reproducible manner associated with other properties of the well bore and rock matrix, such that general calibration (and recalibration) of the logging tool that provides the logs is unnecessary.

SUMMARY OF THE INVENTION

In accordance with the present invention, signals indicative of the oxygen and carbon nucleus concentrations in a porous reservoir rock containing oil, water and gas are obtained using a radioactive logging tool in a reproducible manner such that general calibration (and recalibration) of the logging tool during operations is not required, even in applications where the reservoir is non-saline or where the formation brine has been signficantly varied by previous water floods.

The first step is to record the response of a first suite of logs separately sensitive to the oxygen and carbon nuclei in the rock, for example, using an oxygen log or a pulsed-neutron-capture log, in combination with a carbon/oxygen ratio log; as a precautionary measure, it is assumed that the well has been produced in a manner such that the fluid saturation around the well bore is representative of those in the bulk of the reservoir. The next step consists of making a purposeful change in the region surrounding the well bore by injecting a sufficient quantity of a chemical solvent or combination of solvents to displace substantially all of the formation fluids far enough away from the well bore such that the displaced fluids cannot be detected by the logging tool. Next, the logs are run again. The chemical solvent is then itself displaced by brine of previous saline concentration. Then the logs are run a third time. Thereafter, the gas content of the reservoir can be accurately determined from differences in the responses of the suites of logs combined with known properties of the fluids. During the logging steps the tool does not undergo general calibration (or recalibration), since the present invention involves the utilization of the differences between, rather than the absolute magnitudes of, the log signals.

Further objects, features and advantages of the present invention will become more apparent to those skilled in the art from a detailed reading of the following description of preferred embodiments thereof, when taken in consideration with the accompanying drawings.

PREFERRED EMBODIMENTS OF THE INVENTION

Figure 1:
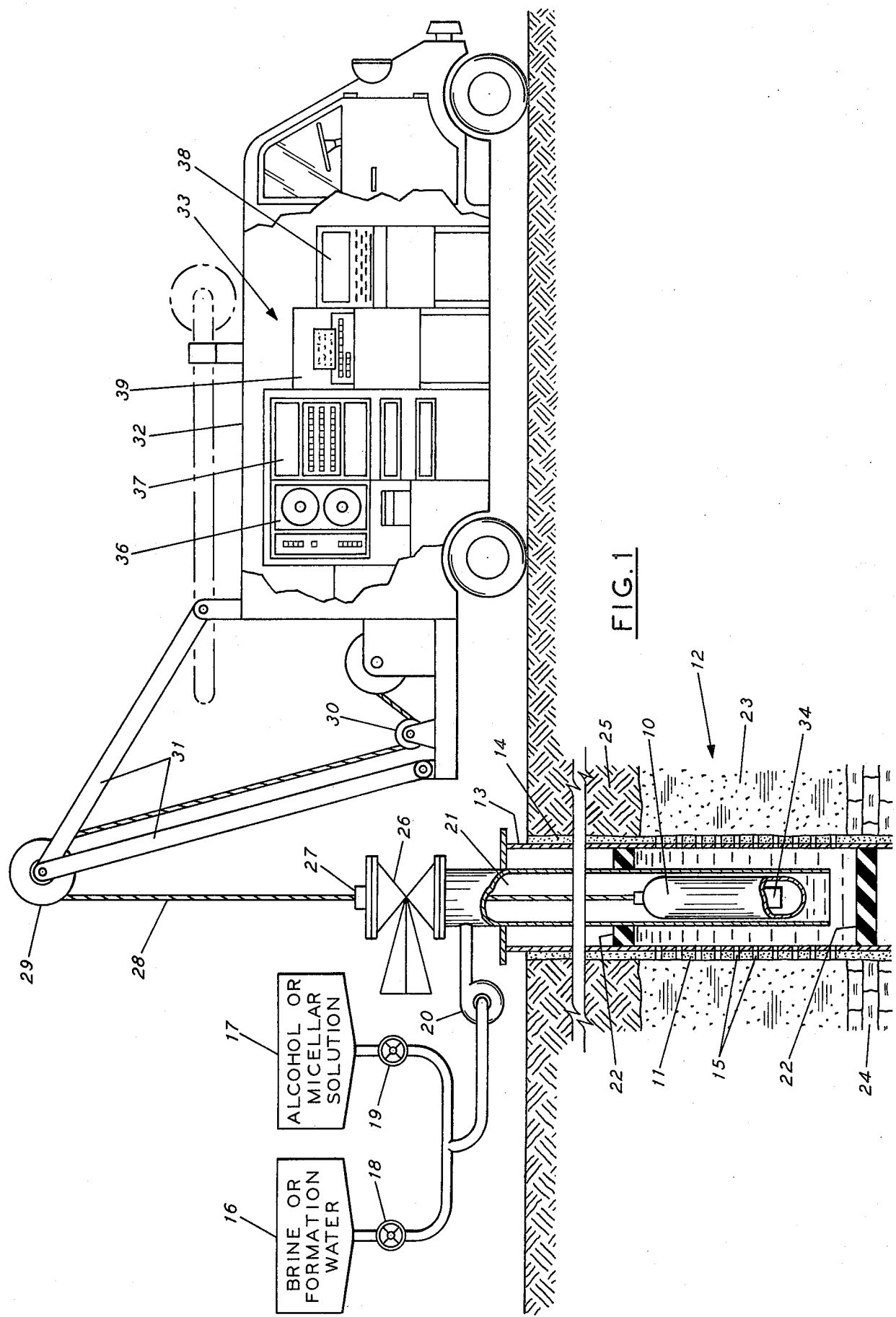
FIG. 1 is a side elevation of a borehole penetrating an earth formation, cut away to illustrate the presence of a logging sonde for carrying out radioactive logging for the determination of gas saturation of the formation in the presence of oil and water.

Referring now to the drawings, particularly to FIG. 1, there is illustrated a radioactive well logging sonde 10 for carrying out a survey operation within well bore 11 penetrating earth formation 12. The well bore 11 is cased with casing 13, sealed to the formation 12 by cement 14. The casing 13 is perforated to provide openings 15. The openings 15 allow fluid flow in two directions: toward the casing 13 during production of gas and oil or away from the borehole 11 toward the formation 12 during preparations for the measurements.

Source tanks 16 and 17 at the earth's surface connect downhole to the interior of tubing 21, say through valves 18, 19 and pump 20. The characteristics of the fluids within the tanks 16, 17 and the sequencing of valves 18, 19 and pump 20 to drive the fluids into the formation 12 are explained in detail below.

In the arrangement of FIG. 1, the tubing 21 is packed off from its upper and lower extremities by packers 22. The packers 22 allow the fluids to pass relative to a selected (and isolated) region of the formation 12 during invasion of the formation by the fluids of the present invention, say into sandstone stratum 23 between shale and cap rock layers 24 and 25, respectively. At the earth's surface, the tubing 21 terminates in a connector 26 having an opening 27 through which a logging cable 28 passes. The cable 28 is reeled via sheaves 29 and 30 attached to supports 31 of a logging truck 32. As the sheaves 29 and 30 are rotated, rectilinear translation of the logging sonde 10 through the well bore 11 occurs.

Constructional characteristics of cable 28 are conventional: it includes a plurality of weight-bearing members surrounding a series of conductors. The ends of the conductors are attached, uphole, to selected elements of control and processing unit 33 within the truck 32 and downhole to a radioactive logging system 34 within the sonde 10.

In general, signals detected by the logging system 34 are recorded on magnetic tape within the control and processing unit 33. Their purpose: to provide a suite of logs--in digital format--which represent formational fluid characteristics. Thereafter the suites of logs are manipulated whereby differences between, rather than the absolute magnitudes of, log signals are used to determine gas saturation of the formation 12.

Now in more detail in the detection mode, note that the signal flow is upward from the logging system 34 through the conductors of cable 28 to the control and processing unit 33. Peripherals of the control and processing unit 33 can include a magnetic tape deck 36, where the detected signals can be stored; after a multiplicity of signals have been received and stored, say from a plurality of logging runs, mathematical processing of the suites of logs can occur with processor 37. Of course, the signals of the logging operations are identified on selected tracks of the tape ("suite of logs") at the deck 36. Accommodation of each tape also is provided, say by logging run, and by depth. Each data bit of each "log" is thus identifiable so as to allow its later combination with other logging information in the manner set forth.

Processor 37 is preferably a minicomputer (a relatively low-cost, small, short-word-length (12–16 bits), limited-core-storageable, microprogrammable device). Control of the processor 37 is provided by appropriate software in cooperation with keyboard terminal 38. Display of the results can occur at the keyboard terminal 38 or via printer 39.

Logging system 34 is controlled in concert with selected injection of fluids from source tanks 16 and 17 to provide meaningful logging measurements as the sonde 10 is positioned within the well bore 11. Characteristics of the radioactive system 34 vary with the types of application and data to be indicated, but in general include a detector, a radioactive source and various shields. Many are operated in such manner as to gate the detector means and provide one or more radioactive logs as a function of depth. Among logging systems 34 commercially available for use in combination within the sonde 10 which have special relevance to the method of the present invention are the following: pulsed-neutron-capture, oxygen-activation and carbon/oxygen-ratio logging systems.

Since these logs themselves are indicative of the operations of the elements which comprise each corresponding logging system, a brief discussion of each log seems to be in order and is presented below.

Pulsed-Neutron-Capture Log

Pulsed-neutron-capture logs are designed to accurately measure the rate of decay of thermal neutrons at a detector following an intense pulse from a high-energy neutron source. The detector is synchronized with the source to operate while the latter is off. The radiation detected can be either slow neutrons or gamma rays resulting from neutron capture; in either case, the log response is related to the population of thermal neutrons in the formation surrounding the borehole. From the time the source is turned off, the slow neutrons are gradually captured and the amount of radiation detected per unit of time decreases until the source is again turned on.

Figure 2:
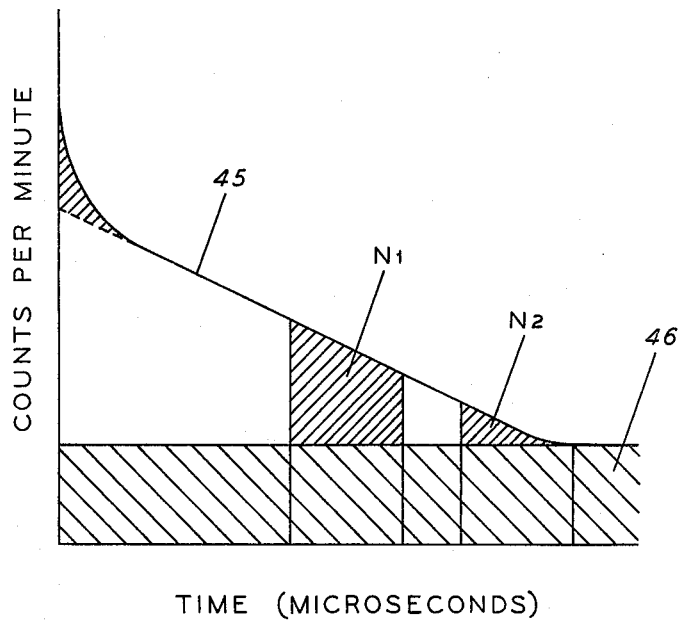
FIGS. 2 and 3 are characteristic amplitude-v.s.-time decay waveforms provided by commercial pulsed-neutron well logging systems for use within the logging sonde of FIG. 1 for carrying out the method of the present invention.

FIG. 2 illustrates the decline of the thermal neutron population as a function of time as measured by the number of thermal neutrons (or gamma rays produced by the thermal neutrons) that are present in the vicinity of the well bore. Thus, the rate of decay of curve 45 of FIG. 2 is dependent upon the nuclei of the material present in the adjacent formation.

Of particular importance in oil, water and gas saturation determinations are the oxygen-abundance signatures provided by monitoring the background indication of the above pulsed-neutron-capture logs. Returning to FIG. 2, background radiation appears in region 46 of the curve 45. Note in this regard that curve 45 results from utilization of a pair of counting-rate curves plus a curve indicative of the rate of decline of the neutron population. The early gate, $N_1$, portion of curve 45 is normally derived during the interval of 400 to 600 microseconds after time zero (the time of termination of the neutron pulse from the neutron source), and is a measure of the radiation intensity detected during that interval. A later gate, $N_2$, portion of the curve 45 is a similar measurement derived during the interval from 700 to 900 microseconds after time zero. By further modification in the manner taught in U.S. Pat. Nos. 3,705,304 and 3,706,884, extraction of the oxygen abundance level of the surveyed formation fluids is possible, say from the relative intensity of background region 46.

Figure 3:
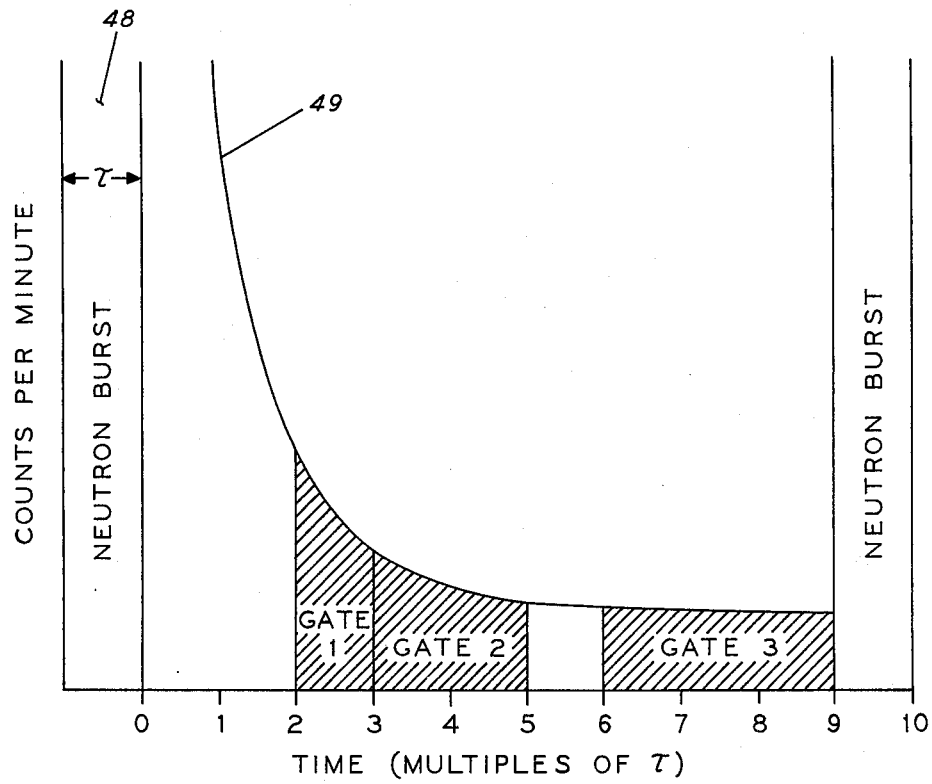

FIG. 3 illustrates another method of gaining an indication of oxygen abundance of a surveyed reservoir by measuring only a component of signals associated with the background radiation of the pulsed-neutron-capture log.

Assume in FIG. 3 that the formation has been irradiated with a pulse of neutrons over a time $\tau$ in a region 48 which is varied to equal the measured exponential decay time for the disappearance of thermal neutrons. Note that time $\tau$ is maintained by continuous corrections to provide a logic rule that curve 49 detected by the logging tool in the interval $2\tau - 3\tau$ is equal to twice that in the interval $3\tau - 5\tau$. Amplitudes of curve 49 are also determined, in part, from the signal measured during the time interval $6\tau - 9\tau$, called the "Gate 3" signal. In this later time interval, the signal from thermal neutrons has decreased to less than 0.0025 times the original thermal neutron signal; so the intensity of the detected signal in this interval represents natural gamma radiation and radiation from the decay of unstable $N^{16}$ formed by neutron activation of $O^{16}$ nuclei. Thus the "Gate 3" response from the above-described logging tool from either the near or the far detectors thereof provides a signal that varies with the oxygen content of the fluids under survey. Time of neutron activation and signal recordation during one cycle of sliding-gate pulsed-neutron logs is, of course, directly proportional to time $\tau$. However, the number of pulses is inversely proportional to $\tau$. During any period containing a number of pulses, then the "Gate 3" response is independent of $\tau$. The sliding-gate pulsed-neutron-log is commercially available and is described in detail in *Transactions of the Society of Professional Well Log Analysts*, "Thermal Neutron Decay Tim Logging Using Dual Detector," J. T. Dewan, C. W. Johnstone, L.A. Jacobson, W. B. Wall, and R. P. Alger, 1973.

Recorded background response of the log of FIG. 2 as well as the "Gate 3" response of the sliding-gate pulsed neutron log of FIG. 3 can be characterized by Equation 1:

$$SO = \alpha_1 + a_2 f(\text{oxygen}) \qquad (1)$$

wherein
SO is the measured response for a certain logging speed at a certain depth;
$\alpha_1$ is a constant reflecting gamma radiation whose origin is not activated oxygen radiation, which includes both natural gamma radiations as well as radiation from activated nuclei other than oxygen;
$\alpha_2$ is a constant reflecting source strength and detector sensitivity to gamma radiation emitted by the unstable $N^{16}$ nucleus that results from activation of $O^{16}$; and
$f$ (oxygen) is some function of the oxygen content in the well, the casing cement (if the well is cased), the reservoir rock, and the fluids contained in the formation.

Referring specifically to Equation (1), it should be noted that the constants $\alpha_1$ and $\alpha_2$ are sensitive to source strength, detector sensitivity and logging speed, and thus are different (in an absolute sense) for the different logs depicted in FIGS. 2 and 3. It is necessary to take steps to insure that these parameters remain constant for successive runs, such as by checking and adjusting logging parameters while the tool is at depths where saturations are not to be changed during the measurement process. The function f (oxygen) will probably not be simply proportional to the overall oxygen content of the material in the well, the casing, and the formation, because each logging tool has different sensitivity to matter at different distances. The pulsed-neutron-capture log is designed to minimize the signal from matter near the tool, however; field experience has moreover shown that well bore fluids and casing cement can influence measurements by the tool; so the signal therefrom cannot be ignored. For the measurement process of the present invention, however, it is necessary only that changes in log response be proportional to changes in oxygen content in the fluids in the formation if all other factors are held constant. Use of background radiation data from pulsed-neutron-capture log responses in the manner of FIGS. 2 and 3 have several additional benefits: (1) existing tools have been developed small enough to be run in tubing, (2) the primary pulsed-neutron-capture log response is also available for supplementary measurements such as a porosity measurement, and (3) depth of investigation is greater.

Oxygen Logs Specifically Designed to Record Oxygen

Neutron-activation logging to measure the oxygen content of the formation is also available, and one system is proposed in U.S. Pat. No. 3,465,151 by A. H. Youmans. In that system, the neutron-activated radiation is sensed downhole in a manner that such radiation can be related to the oxygen content of the region around the well bore. The essential difference between such a log and the above-discussed background signal from pulsed-neutron-capture logs of FIG. 3 is that in a log specifically designed for oxygen measurement, more effort must be applied to exclude signals unrelated to oxygen content. In other words, radiation not associated with the decay of the unstable $N^{16}$ nucleus which is produced by interaction of high-energy neutrons with $O^{16}$ must be excluded. This is achieved by noting that oxygen-related radiation in such logs dies away with a time constant of 7.3 seconds; thus it can be distinguished from other radiation on the basis of its persistence.

Since the uses of the present invention involve the difference between, rather than the absolute magnitudes of, log signals, the exclusion of unrelated signals is also of less importance; logs specifically designed to measure oxygen activation are suitable for carrying out the method of the present invention. If source strength, detector sensitivity, and logging speed are constant, the signal from the oxygen log can be described by Equation (1), where SO represents the oxygen-log response. The parameters $\alpha_1$, $\alpha_2$, and $f$ (oxygen) have the same meanings discussed above but are related to the characteristics of an oxygen log.

Carbon-Oxygen Logs

An instrument system for logging measurement of the relative carbon content in reservoir rocks has been proposed in paper 4640 of Society of *Petroleum Engineers* of AIME by R. B. Culver, E. C. Hopkinson, and A. H. Youmans entitled "Carbon Oxygen (C/O) Logging Instrumentation," 1973.

In that system, gamma rays produced by inelastic scattering of neutrons are detected and analyzed by a scintillation spectrometer system. Spectral analysis of the detected radiation allows separation of detected radiation into regions related to scattering by carbon, oxygen, calcium, and silicon nuclei. Currently available instrumentation has been found to be sufficiently accurate to enable identification of formation fluid but is too dependent on variables unrelated to saturation for measurement of its quantity. Since the uses of the present invention involve steps which vary the character of the formation fluids which can respond to the logging operation ("formation calibration"), currently available carbon-oxygen logging tools can be used for quantitative determinations so long as all data are indicated and that data are processed in the manner set forth below.

The responses of current models of such logs are usually presented as the ratio of the total signal counts detected in the energy region reflecting carbon content to the counts reflecting oxygen content. The total counts rather than the ratio are used for the measurement of fluid saturations.

While the number of counts recorded in the energy range sensitive to inelastic scattering of neutrons by oxygen nuclei can be described by Equation 1, the number of counts recorded in the energy range sensitive to carbon is described by Equation 2:

$$Sc = \beta_1 + \beta_2 g(\text{carbon}) \qquad (2)$$

wherein

Figure 4:
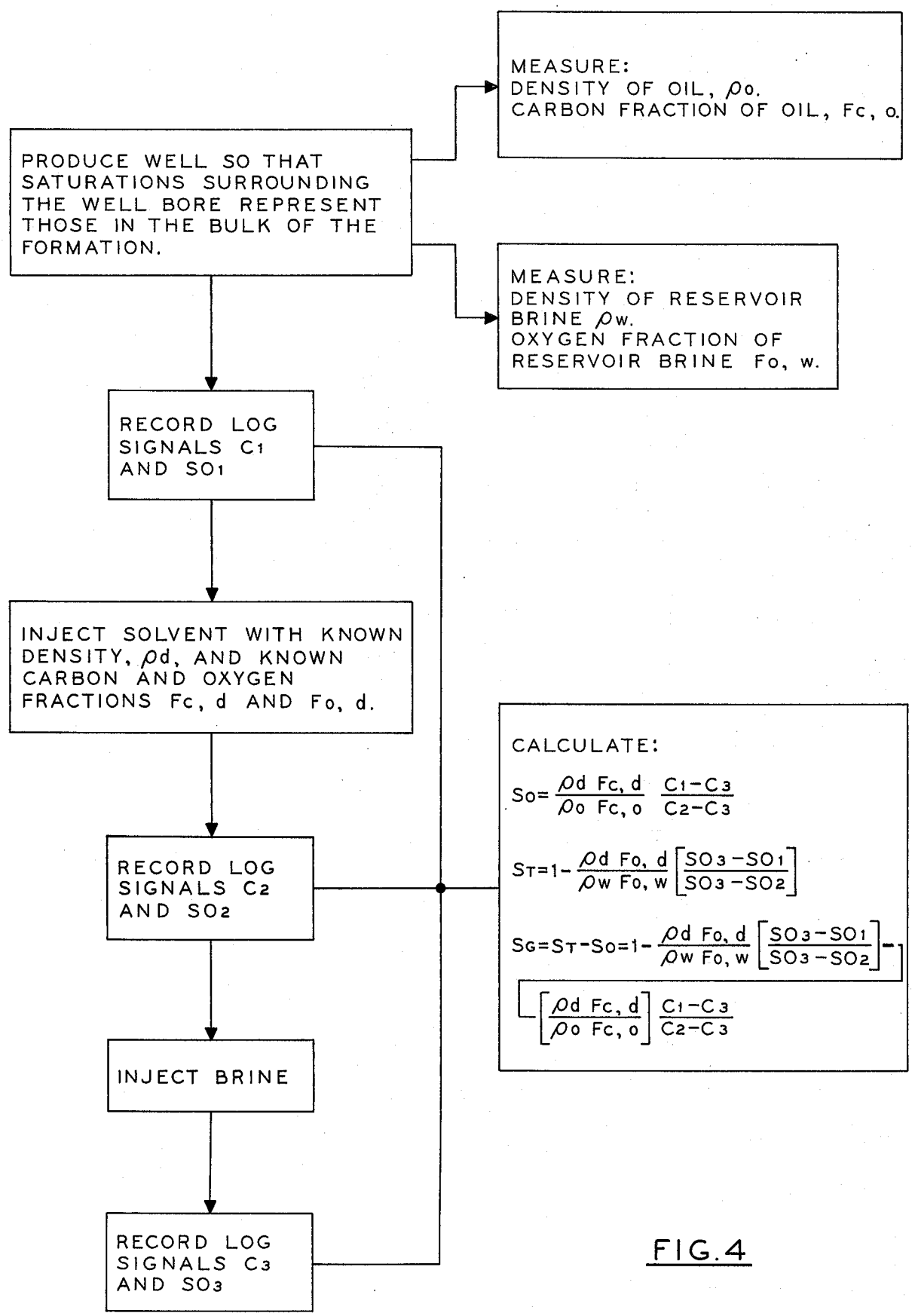
FIG. 4 is a block diagram illustrating steps used in carrying out the method of the present invention for determining the gas saturation of the formation of FIG. 1.

Sc is the total signal recorded in the energy range corresponding to inelastic scattering of neutrons by carbon;

$\beta_1$ is the total signal in that energy range due to effects other than inelastic scattering by carbon;

$\beta_2$ is a constant reflecting instrumental response in the energy range corresponding to inelastic scattering of neutrons by carbon; and g (carbon) is a function of the carbon content in the well, the casing cement, the reservoir rock, and the hydrocarbons in the porous formation. FIG. 4 illustrates the steps of the present invention in detail.

Note that while logging techniques are commercially available to measure parameters of interest related to the formation and formation fluids about the well bore, it is necessary that steps be taken preliminary to the logging of the well to insure that the fluid content of the region of interest reflect as nearly as possible the fluid content throughout the reservoir. Effects associated with rapid production of the well can be minimized by producing it slowly or by shutting-in the well for some time before the logs are recorded. After saturation in the vicinity of the well bore have been made equal to those in the reservoir, the formation can be logged by the logging methods previously described.

Assume in FIG. 4 that operations in accordance with the present invention use two particular logging methods in combination: (i) a pulsed-neutron-capture logging system and (ii) and inelastic-scattering-of-neutrons-by-carbon-nuclei logging system. These systems provide, for a given depth D, two separate signals $SO_1$ and $C_1$, for a first suite of logs as shown in FIG. 4; after the first suite of logs has been obtained, a purposeful change is made in the region of interest by injecting into it fluid or fluids from the source tank 17 of FIG. 1. Characteristics of the injected fluids: they must have the capability of removing all of the formation fluids from the region of interest. One process consists of injecting a solvent followed by alcohol; a second consists of injecting a micellar solution preceded, if necessary, by sufficient fresh water to prevent emulsification of the solution. These techniques have been described for use with other well logging methods, for example, by R. P. Murphy, W. W. Owens, and D. L. Dauben in U.S. Pat. No. 3,757,575. For the measurement process herein described, it has been mentioned that the displacing fluid must have known properties. Specifically, it is necessary that the volume fraction of oxygen and carbon in the displacing fluid be known. If fluids of unknown composition are used, this fraction can be accurately measured with currently available laboratory techniques.

While the displacing fluid is in the porous reservoir rock, the next step consists of running the logs a second time. The second suite of logs provides separate signals $SO_2$ and $C_2$ of FIG. 4. Because part of the recorded signal is determined by the fluids within the well bore, it is desirable to insure that fluids of the same characteristics remain in the well bore for all logging runs in the manner explained below.

The fourth step of the process consists of injecting enough brine into the formation from source tank 16 of FIG. 1 to insure that the solvent that displaced the formation fluids is itself displaced into the formation beyond the region of tool response. The preferred brine for this step is produced brine of known characteristics.

The fifth step consists of recording the log response a third time when the formation is filled with the brine described above; the third suite of logs provides separate $SO_3$ and $C_3$ log signals, respectively.

Calculations can then occur at the well site using the processor 37 of FIG. 1 to indicate gas saturation.

The basis of the calculations is set forth below, in which total fluid saturation, St, is first determined from the measurements related to oxygen concentration.

The magnitude of a pulsed-neutron-log signal reflecting oxygen abundance can be represented by a more detailed form of Equation 1:

$$SO_1 = \alpha_1 + \alpha_2 f(\Omega_f, \Omega_c, \Omega_r, \Omega_{p,w1}) \qquad (3)$$

wherein $\Omega_f$ is the mass of oxygen contained in fluids in the well;

$\Omega_c$ is the mass of oxygen contained in the cement casing;

$\Omega_r$ is the mass of oxygen contained in the reservoir rock; and $\Omega_{p,w1}$ is the mass of oxygen contained in the water in the porous part of the formation after the well is produced.

The magnitude of the second oxygen-related signal, $SO_2$ can be represented by Equation 4:

$$SO_2 = \alpha_1 + \alpha_2 f(\Omega_f, \Omega_c, \Omega_r, \Omega_{p,D}) \qquad (4)$$

where $\Omega_{p,d}$ is the mass of oxygen contained in the displacing agent which fills the porous rock at the time of the second logging run.

The magnitude of the oxygen-related signal from the third log, $SO_3$, can be represented by Equation 5:

$$SO_3 = \alpha_1 + \alpha_2 g(\Omega_f, \Omega_c, \Omega_r, \Omega_{\rho,w2}) \quad (5)$$

where $\Omega_{\rho,w2}$ is the mass of oxygen contained in the water which now completely fills the porous part of the formation.

The oxygen content of the water in the porous reservoir at the time of the first set of logs, $\Omega_{\rho,w1}$, is described by Equation 6:

$$\Omega_{\rho,w1} = \phi \rho_w S_w F_{o,w} V \quad (6)$$

wherein
$\phi$ = the porosity of the formation;
$\rho_w$ = the density of the formation brine;
$F_{o,w}$ = the ratio of the mass of oxygen to the over-all mass of the formation brine;
$V$ = the effective volume sensed by the log; and
$Sw$ = the water saturation representative of the reservoir.

The oxygen content of the displacing agent filling the porous reservoir when the second log is run, $\Omega_{\rho,D}$, can be represented by Equation 7:

$$\Omega_{\rho,D} = \phi \rho_D F_{o,D} V \quad (7)$$

wherein
$\rho_D$ = density of the displacing agent;
$F_{o,D}$ = ratio of the mass of oxygen to the over-all mass of the displacing agent.

The oxygen content of the porous reservoir filled with brine when the third log is run, $\Omega_{\rho,w2}$, can be represented by Equation 8:

$$\Omega_{\rho,w2} = \phi \rho_w F_{o,w} V \quad (8)$$

Water saturations (Sw) can be computed at each depth from the differences in the log responses described above. The ratio between differences of recorded signals can be represented by Equations 9 and 10:

$$\frac{SO_3 - SO_1}{SO_3 - SO_2} = \frac{f(\Omega_f,\Omega_c,\Omega_r,\Omega_{\rho,w2}) - f(\Omega_f,\Omega_c,\Omega_r,\Omega_{\rho,w1})}{f(\Omega_f,\Omega_c,\Omega_r,\Omega_{\rho,w2}) - f(\Omega_f,\Omega_c,\Omega_r,\Omega_{\rho,D})} \quad (9)$$

$$= \frac{\frac{\delta_f}{\delta\Omega\rho}(\Omega_{\rho,w2} - \Omega_{\rho,w1})}{\frac{\delta_f}{\delta\Omega\rho}(\Omega_{\rho,w2} - \Omega_{\rho,D})}$$

$$= \frac{(\rho_w F_{o,w} - S_w \rho_w F_{o,w})}{(\rho_w F_{o,w} - \rho_D F_{o,D})}$$

$$Sw = 1 - \left[1 - \frac{\rho_D F_{o,d}}{\rho_w F_{o,w}}\right] \frac{SO_3 - SO_1}{SO_3 - SO_2} \quad (10)$$

It is also evident that if the formation contains gas within the zone of interest, then total gas and oil saturations at a depth D can be inferred from Equation 10, vis:

$$S_t = 1 - Sw = \left[1 - \frac{\rho_D F_{o,D}}{\rho_w F_{o,w}}\right] \frac{SO_3 - SO_1}{SO_3 - SO_2} \quad (11)$$

Oil-saturation calculation by inelastic scattering of neutrons by carbon at the same depth D is next.

The magnitude of the detected signal from inelastic scattering of neutrons by carbon nuclei when saturations around the well bore equal those in the bulk of the reservoir can be represented by a more detailed form of Equation 2, supra:

$$c_1 = \beta_1 + \beta_2 g(\tau_f, \tau_c, \tau_r, \tau_{\rho,m1}) \quad (12)$$

wherein
$C_1$ is the total signal recorded at a particular depth;
$g(\tau_f, \tau_c, \tau_r, \tau_{\rho,1})$ is a function reflecting relative sensitivity of the radiation source--detector combination to the carbon-nucleus density of the fluids in the well bore, the cement surrounding the case, the rock matrix in the reservoir around the well bore, and the fluids in the pore fraction of the matter around the well bore;
$\tau_f$ is the density of carbon nuclei in the fluids in the well bore;
$\tau_c$ is the density of carbon nuclei in the cement surrounding the casing;
$\tau_r$ is the density of carbon nuclei in the reservoir rock matrix; and
$\tau_{\rho,1}$ is the density of carbon nuclei in the fluids in the porous part of the matter around the well bore under original conditions.

The carbon density can be expressed by Equation 13:

$$\tau_{\rho,1} = \phi \rho_o S_o F_{c,o} V \quad (13)$$

wherein
$\phi$ = the porosity of the formation;
$\rho_o$ = the density of oil in the formation;
$S_o$ = the oil saturation representative of the reservoir;
$F_{c,o}$ = the ratio of the mass of carbon to th over-all mass of oil at reservoir conditions; and
$V$ = the effective volume sensed by the log.

The magnitude of the signal of the second log run after injection of a fluid which saturates the formation, $C_2$, can b described by Equation 14:

$$C_2 = \beta_1 + \beta_2 g(\tau_f, \tau_c, \tau_r, \tau_{\rho,D}) \quad (14)$$

Here $$\tau_{\rho,D} + \phi \rho_d F_{c,d} V \quad (15)$$

wherein
$\rho_d$ = the density of the displacing fluid;
$F_{c,d}$ = the ratio of the mass of carbon to the over-all mass of the displacing fluid.

The displacing fluid is itself displaced by brine. The salinity of the brine is not important to the carbon-log measurement of oil content; so formation brine can be used. The response of the third log run after injection of the formation brine, $C_3$, can be described by Equation 16:

$$C_3 = \beta_1 + \beta_2 g(\tau_f, \tau_c, \tau_r, 0) \quad (16)$$

where the term describing the carbon content of fluids in the pores is set to zero, reflecting the fact that brine has no carbon content.

Oil saturation can be computed from the differences in the carbon log responses described above and from density and carbon fractions measured uphole. The ratio between differences of recorded signals can be represented by Equation 17.

$$\frac{C_1 - C_3}{C_2 - C_3} = \frac{g(\tau_f,\tau_c,\tau_r,\tau_{\rho,1}) - g(\tau_f,\tau_c,\tau_r,0)}{g(\tau_f,\tau_c,\tau_r,\tau_{\rho,2}) - g(\tau_f,\tau_c,\tau_r,0)} \quad (17)$$

$$= \frac{\frac{\delta_g}{\delta\tau\rho}\phi\rho_o S_o F_{c,o} V}{\frac{\delta_g}{\delta\tau}\phi\rho_d F_{c,d} V}$$

-continued $$= S_o \frac{\rho_o F_{c,o}}{\rho_d F_{c,d}}$$

The oil saturation is thus found from Equation 18:

$$S_o = \frac{\rho_d F_{c,d}}{\rho_o F_{c,o}} \frac{C_1 - C_3}{C_2 - C_3} \quad (18)$$

It is noted that the carbon/oxygen-ratio log described above presents data related to inelastic scattering of neutrons by oxygen as well as by carbon; the above log signal can also be used to calculate water satuarations as described above.

Since the total saturation St (Equation 11) provides a direct indication of oil and gas in the interval of interest based on oxygen nuclei concentration and since the oil saturation based on carbon nuclei concentration is also separately indicated (Equation 18), then a difference between Equations 11 and 18 will provide a gas saturation indication for the formation at the depth D of interest. I.e., $$S_g = St - So \quad (19)$$

$$= \left(1 - \frac{\rho_o F_{o,d}}{\rho_w F_{o,w}}\right)\left(\frac{SO_3 - SO_1}{SO_3 - SO_2}\right) - \frac{\rho_d F_{c,d}}{\rho_o F_{c,o}} \frac{C_1 - C_3}{C_2 - C_3}$$

ILLUSTRATIVE EXAMPLE

The following is an example of the use of combined pulsed-neutron-capture log and carbon/oxygen log data to determine gas saturation around a well. A water flood in the field replaces an unknown fraction of the original formation brine by water with a different salinity. Economic evaluation of a proposed tertiary recovery program requires accurate determination of both porosity and oil, water and gas saturations through a 20' interval. These determinations are made from signals available from a sliding-gate pulsed-neutron-capture log, and a carbon/oxygen log over the 20' interval.

Step number one consists of running the logs in the well after production has terminated. The logging tool is run through the depth interval of interest a number of times in order to reduce statistical errors of the measured values. The average of the gate three ($F_3$) signals of the neutron-capture log at a particular depth is 103.6 counts, while the total counts recorded in the range of energies associated with inelastic scatter by carbon nuclei per a selected time is 19,200 counts. For the pulsed-neutron-capture log, the average capture cross-section is 15.7 c.u. The latter value is not used in any of the calculations that follow, however, because the salinity of the brine in any particular part of the formation is unknown.

The second step is accomplished by the injection of a miscible solvent such as alcohol or methanol followed by enough isopropanol to insure complete displacement of the solvent several feet away from the well bore. This injection is accomplished by setting a plug below and a packer above the interval logged. After the injection step is completed, the packer is unseated and enough produced brine is injected to replace the alcohol in the annulus between tubing and casing. This insures that the same fluids are present within the well bore at each logging step so that differences in logged values reflect only changes of the fluids in the formation.

The third step consists of a second running of the pulsed-neutron-capture and carbon/oxygen logs. Data are recorded through the interval of interest as well as an adjacent interval in order to confirm that efforts were successful in keeping logging panel settings and logging speeds the same as they were when the original sets of logs were recorded. From the multiple logging passes through the interval of interest, it is determined by the neutron-capture log that the capture cross-section, $\Sigma_2$, is now 14.8 c.u., and the average gate three ($F_3$) signal, $(F_3)_2$, is now 82.0 counts; while for the carbon/oxygen log the total signal recorded is 22,100 counts.

Step number four consists of injection of approximately 100 bbls of brine of known capture cross-section into the formation. The salinity of the brine is chosen to be from 10,000–50,000 ppm NaCl.

The final step consists of repeating the pulsed-neutron-capture and carbon/oxygen logs. For the former, the average capture cross-section measured at the particular depth of interest is now $\Sigma_3 = 19.6$ c.u., and the average gate three ($F_3$) signal is now $(F_3)_3 = 137.2$ counts; while for the carbon/oxygen log the signal for carbon is 15,050 counts.

In order to calculate the water, oil and gas saturations it is necessary to use the following constants:

density of isopropanol at reservoir temperature, $\rho_D = 0.757$ g/cm³ fractional mass of oxygen in isopropanol, $F_{o,d} = 0.266$

Thermal-neutron-capture cross-section of isopropanol, $\Sigma_D = 20.0$ c.u.

density of brine at reservoir temperature, $\rho_w = 1.027$ g/cm³ fractional mass of oxygen in brine, $F_{o,w} = 0.855$

Thermal-neutron-capture cross-section of 50,000 ppm NaCl brine, $\Sigma_w = 40.0$ c.u.

fractional mass of carbon in isopropanol, $F_{c,d} = 0.60$ fractional mass of carbon in reservoir crude, $F_{c,o} = 0.86$ oil density $= 0.98$ Equation 10, supra, can be evaluated:

$$Sw = 1 - \left[\frac{137.2 - 103.6}{137.2 - 82.0}\right]\left[1 - \left(\frac{0.757 \times 0.266}{1.027 \times 0.855}\right)\right] = 0.531$$

Equation 11, supra, can also be evaluated:

St = 1 − Sw = 0.469 Porosity can also be determined from the cross-sections measured by the pulsed-neutron-capture log:

$$\phi = \frac{19.6 - 14.8}{40.0 - 20.0} = 0.24$$

Equation 18, supra, can then be evaluated:

$$So = \frac{.757 \times .60}{.98 \times .86}\left[\frac{19,200 - 15,050}{22,100 - 15,050}\right] = 0.32$$

Likewise, Equation 19 can be indicated:

Sg = ST − SO = 0.469 − 0.32 = 0.149

MODIFICATION

In some applications, it is possible to omit the last injection of brine surrounding the well bore and the subsequent logging of the fluids by the logging system depicted in FIG. 1. For the modification to be effective, it must be recognized from the data that a given depth interval in the well has properties substantially equivalent to the tested interval of interest and the former is known to contain no water and no oil. Saturation is then calculated using the signal recorded in this region in place of the signals would have been recorded after the final injection stage.

In order to insure that the later-obtained logs only reflect changes due to fluid injection into the formation, some normalization may be desirable. E.g., changes in log sensitivity, if any, can be determined from log responses taken at a depth in the well bore that is unaffected by the injected fluids.

Also, since a component of the logged response is from the interior fluids within the well bore over the regions of interest, precaution should be taken to insure that that remains unchanged during subsequent logging operations. Since the chemical composition of the injected fluids and the original borehole fluids are known, however, it is apparent that their effects can be determined, after which restoration of the original response characteristics can be achieved. In that way, the response character of the original interior well bore fluids remains substantially constant during all logging operations.

Also, replacement of the displacing fluid within the cased hole can often be accomplished by unseating the packer used to seal off the interval of interest and injecting produced brine. Since this brine is heavier than the displacing fluid, the lower part of the hole can be filled with the brine, without raising the pressure enough to cause its injection into the formation. it is often useful to put enough bring into the hole so that it fills the hole through not only the formation of interest but also another region in the hole. Logs recorded through this latter region can be used to check log responses.

While specific embodiments of the invention have been described in detail, it should be understood that the invention is not limited thereto as many variations will be readily apparent to those skilled in the art, and thus the invention is to be given the broadest possible interpretation within the terms of the following claims.

What is claimed is:

1. A method of measuring the concentration of gas in an earth formation constituting a given depth interval of a region surrounding a well bore, comprising:
   a. running, over said given depth interval, separate first and second logs whose response to the carbon and oxygen contents of said region is substantially linear throughout the range of expectable carbon and oxygen contents, respectively,
   b. injecting into said region a solvent capable of replacing substantially all of the previous fluids in the part of said region to which said logs are responsive,
   c. running said logs a second time to obtain respective signals changed from those of the first running, the changes reflecting the effects of Step (b),
   d. injecting brine to replace substantially all of said solvent within the part of said region to which said logs are responsive,
   e. running said logs a third time to obtain signals changed from those of the second running, the changes reflecting the effects of Step (d),
   f. calculating gas saturation of said region from respective corresponding measured differences in the signals of said separate first and second logs of Steps (a), (c), and (e), respectively, in accordance with the Equation:

$$Sg = St - So = (1 - Sw) - So = \left[1 - \frac{\rho_d F_{o,d}}{\rho_w F_{o,w}}\right] \frac{SO_3 - SO_1}{SO_3 - SO_2} - \left(\frac{\rho_d F_{c,d}}{\rho_o F_{c,d}}\right) \frac{C_1 - C_2}{C_2 - C_3}$$

wherein
   $C_1$, $C_2$ and $C_3$ and $SO_1$, $SO_2$ and $SO_3$ refer to separate log responses recorded in Steps (a), (c) and (e) respectively;
   $\rho_d$ = density of liquid in the formation after Step (b);
   $F_{o,d}$ = ratio of the mass of oxygen to the total mass of the above-specified liquid;
   $F_{c,d}$ = ratio of the mass of carbon to the total mass of the above-specified liquid;
   $\rho_w$ = density of the formation brine;
   $\rho_o$ = density of the oil in the formation;
   $F_{o,w}$ = ratio of the mass of oxygen to the over-all mass of the formation brine;
   $F_{c,w}$ = ratio of the mass of carbon to the total mass of the oil; and
   $Sg$ = fraction of the pore volume containing gas.

2. A method of measuring the concentration of gas in an earth formation constituting a given depth interval of a region surrounding a well bore, comprising:
   a. running, over said given depth interval, separate first and second logs with respective responses to the carbon and oxygen content of said region and whose responses are substantially linear throughout the range of expectable carbon and oxygen contents, and running, over one or more other depth intervals known individually or in combination to contain substantially no water and no oil, the same said log,
   b. injecting into said region adjacent to said given depth interval a solvent capable of replacing substantially all of the previous liquids in the part of said adjacent region to which said log is responsive,
   c. running said log over said given depth interval a second time to obtain signals changed from those of the first running, the changes reflecting the effects of Step (b),
   d. calculating gas saturation from the measured difference in corresponding signals of said respective first and second logs of Steps (a) and (c), in accordance with the Equation:

$$Sg = St - So = (1 - Sw) - So = \left[1 - \frac{\rho_d F_{o,d}}{\rho_w F_{o,w}}\right] \frac{SO_3 - SO_1}{SO_3 - SO_2} - \frac{\rho_d F_{c,d}}{\rho_o F_{c,d}} \left(\frac{C_1 - C_2}{C_2 - C_3}\right)$$

where
   $C_1$, $C_2$ and $SO_1$ and $SO_2$ refer to recorded responses of said first and second logs, respectively at said given depth interval in Steps (a) and (c);
   $C_3$ and $SO_2$ refer to the recorded log response at said one or more other depth intervals known to contain substantially no oil and no water, respectively;
   $\rho_d$ = density of liquid in the formation after Step (b);
   $F_{o,d}$ = ratio of the mass of oxygen to the total mass of the above-specified liquid;

$F_{c,d}$ = ratio of the mass of carbon to the total mass of the above-specified liquid;
$\rho_w$ = density of the formation brine;
$\rho_o$ = the density of oil in the formation;
$F_{o,w}$ = ratio of the mass of oxygen to the over-all mass of the formation;
$F_{c,w}$ = ratio of the mass of carbon to the formation total mass brine of the oil; and
$S_g$ = fraction of the pore volume containing gas.

3. A method of measuring the concentratioan of gas in an earth formation constituting a given depth interval of a region surrounding a well bore, comprising:
  a. running, over said given depth interval, separate first and second logs whose response to the carbon and oxygen contents of said region is substantially linear throughout the range of expectable carbon and oxygen contents, respectively,
  b. injecting into said region a solvent capable of replacing substantially all of the previous fluids in the part of said region to which said logs are responsive,
  c. running said logs a second time to obtain respective signals changed from those of the first running, the changes reflecting the effects of Step (b),
  d. injecting brine to replace substantially all of said solvent within the part of said region to which said logs are responsive,
  e. running said logs a third time to obtain signals changed from those of the second running, the changes reflecting the effects of Step (d),
  f. calculating gas saturation of said region from respective corresponding measured differences in the signals of said separate first and second logs of Steps (a), (c), and (e), respectively.

4. The method of claim 3 in which said response to said carbon content is based on the detection of gamma rays resulting from the inelastic scattering of neutrons by carbon nuclei, and said response to said oxygen content is based on detection of gamma rays resulting from neutron activation of oxygen nuclei.

5. The method of claim 3 in which possible changes in log sensitivity between logging runs are compensated for by recording log response through some depth interval in the well which is not affected by injected fluids.

6. The method of claim 3 in which the injection Steps (b) and (d) are followed by substeps in which the fluid within the well bore itself is restored to a composition having substantially the same effect on the logs as did the fluid that was in said well bore during Step (a).

7. A method of measuring the concentration of gas in an earth formation constituting a given depth interval of a region surrounding a well bore, comprising:
  a. running, over said given depth interval, separate first and second logs with respective responses to the carbon and oxygen content of said region and whose responses are substantially linear throughout the range of expectable carbon and oxygen contents, and running, over one or more other depth intervals known individually or in combination to contain substantially no water and no oil, the same said log,
  b. injecting into said region adjacent to said given depth interval a solvent capable of replacing substantially all of the previous liquids in the part of said adjacent region to which said log is responsive,
  c. running said log over said given depth interval a second time to obtain signals changed from those of the first running, the changes reflecting the effects of Step (b),
  d. calculating gas saturation from the measured difference in corresponding signals of said respective first and second logs of Steps (a) and (c).

* * * * *

UNITED STATES PATENT AND TRADEMARK OFFICE
CERTIFICATE OF CORRECTION

PATENT NO. : 3,993,903
DATED : November 23, 1976
INVENTOR(S) : Charles H. Neuman It is certified that error appears in the above—identified patent and that said Letters Patent are hereby corrected as shown below:

Col. 1, line 12   delete   "563,922".

Col. 14, line 63, "$C_3$ and $SO_2$" should read -- $C_3$ and $SO_3$ --.

Col. 15, line 10, "concentratioan" should read -- concentration --.

Signed and Sealed this

Twelfth Day of April 1977

[SEAL]

Attest:

RUTH C. MASON
*Attesting Officer*

C. MARSHALL DANN
*Commissioner of Patents and Trademarks*